United States Patent [19]
Lu

[11] Patent Number: 5,254,390
[45] Date of Patent: Oct. 19, 1993

[54] PLANO-CONVEX BASE SHEET FOR RETROREFLECTIVE ARTICLES AND METHOD FOR MAKING SAME

[75] Inventor: Shih-Lai Lu, Woodbury, Minn.

[73] Assignee: Minnesota Mining and Manufacturing Company, St. Paul, Minn.

[21] Appl. No.: 613,136

[22] Filed: Nov. 15, 1990

[51] Int. Cl.$^5$ .............................. B32B 3/00
[52] U.S. Cl. ...................... 428/156; 428/143; 428/148; 428/161; 428/163; 428/164; 428/167; 428/168; 428/172; 428/195; 428/201; 428/206; 428/209; 428/215; 428/344; 428/354; 428/906; 359/291; 359/321; 359/536; 359/542; 359/641
[58] Field of Search ............. 428/167, 172, 156, 161, 428/163, 164, 141, 143, 148, 168, 215, 194, 201, 206, 207, 212, 402, 409, 906, 343, 344, 354; 359/227, 291, 321, 536, 542, 641; 356/71, 445

[56] References Cited

U.S. PATENT DOCUMENTS

| | | | |
|---|---|---|---|
| T987,003 | 10/1979 | Johnson et al. | 356/445 |
| 2,444,356 | 6/1948 | Luce | 350/106 |
| 2,951,419 | 9/1960 | Lemelson | 88/82 |
| 3,332,775 | 7/1967 | Mandler | 96/45 |
| 3,503,315 | 3/1970 | de Montebello | 95/18 |
| 3,689,346 | 9/1972 | Rowland | 156/245 |
| 3,700,305 | 10/1972 | Bingham | 350/105 |
| 3,801,183 | 4/1974 | Sevelin et al. | 350/105 |
| 3,919,031 | 11/1975 | White | 156/219 |
| 3,961,956 | 6/1976 | Fukuda et al. | 96/40 |
| 3,963,309 | 6/1976 | Schwab | 350/104 |
| 4,025,674 | 5/1977 | Mizuochi | 428/29 |
| 4,099,838 | 7/1978 | Cook et al. | 350/105 |
| 4,127,693 | 11/1978 | Lemelson | 428/163 |
| 4,340,301 | 7/1982 | Schwab | 350/106 |
| 4,374,077 | 2/1983 | Kerfeld | 264/22 |
| 4,414,316 | 11/1983 | Conley | 430/496 |
| 4,420,502 | 12/1983 | Conley | 427/54.1 |
| 4,505,966 | 3/1985 | Bailey | 428/164 |
| 4,576,850 | 3/1986 | Martens | 428/156 |
| 4,688,894 | 8/1987 | Hockert | 350/105 |
| 4,691,993 | 9/1987 | Porter et al. | 350/105 |
| 4,869,946 | 9/1989 | Clay | 428/167 |

*Primary Examiner*—Donald J. Loney
*Attorney, Agent, or Firm*—Gary L. Griswold; Walter N. Kirn; Robert H. Jordan

[57] ABSTRACT

An article comprising a transparent plano-convex base sheet having first and second broad faces, the second face being substantially planar and the first face having an array of substantially hemi-spheroidal microlenses thereon, the shape of the microlenses and thickness of the base sheet being such that collimated light substantially orthogonally incident to the array is focused approximately at the second face. The article optionally further comprising a specularly reflective layer on the second face which renders the base sheet retroreflective. An optional layer of adhesive over the reflective layer permits the article to be adhered to a document as a tamper-indicating, authenticating, and protective overlay. Special images can be formed within the article to enhance the security provided thereby. Also, a method for forming such articles.

22 Claims, 2 Drawing Sheets

PLANO-CONVEX BASE SHEET FOR RETROREFLECTIVE ARTICLES AND METHOD FOR MAKING SAME

FIELD OF THE INVENTION

The invention concerns a novel plano-convex base sheet and retroreflective articles, e.g., used as transparent overlays to protect documents from tampering, comprising same. The invention also concerns a method for making such base sheets and retroreflective articles.

BACKGROUND OF THE INVENTION

Documents often have adherent transparent overlays to provide protection against dirt, moisture, and general wear and tear. A typical protective transparent overlay has a plastic film bearing an aggressive adhesive layer by which it can be permanently adhered to the face of a document. A transparent overlay which does not obscure underlying information is disclosed in U.S. Pat. No. 3,801,183 (Sevelin et al.). The patent discloses legend-containing sheet materials which have retroreflective legend and retroreflective background areas that are substantially indistinguishable under ordinary diffuse light viewing conditions but are clearly distinguishable under retroreflective viewing conditions. Attempts to tamper with information over which the overlay has been applied result in readily detectable disruption of the overlay.

Subsequent to U.S. Pat. No. 3,801,183, a number of patents have issued disclosing other transparent overlays, each of which can be imaged with a pattern or legend that is readily noticeable only when viewed retroreflectively and can be adhesively bonded to a document without obscuring the face of the document. See, for example, U.S. Pat. No. 4,099,838 (Cook et al.) which discloses an overlay wherein the retroreflection from the background and image areas of the pattern is of contrasting colors. See also U.S. Pat. Nos. 4,688,894 (Hockert) and No. 4,691,993 (Porter et al.), which disclose transparent overlays that function similarly as those of U.S. Pat. No. 3,801,183 while having the added capability of permitting an authenticating message to be formed in the overlay after it has been adhesively bonded to a document.

The transparent protective overlays of each of the above-cited patents each comprise a monolayer of glass microspheres that makes the overlay expensive and difficult to counterfeit.

U.S. Pat. No. 4,869,946 (Clay) discloses a security card comprising a transparent upper layer having narrow parallel lenses on its outer surface and an image-containing substrate on its inner surface. The two layers form a lenticular system by which images on the substrate are selectively viewable depending upon the angle from which the card is viewed.

U.S. Pat. No. 3,503,315 (de Montebello) discloses a lenticular plate or sheet comprising adjacent lenslets with spherical convex surfaces on both sides. The sheet is used for the production and display of a picture in panoramic stereoscopic relief.

U.S. Pat. No. 4,576,850 (Martens) concerns shaped plastic articles made by replicating a microstructure-bearing surface with an ultraviolet-curable organic oligomeric composition.

A number of other patents also concern shaped plastic articles made by replicating a microstructure-bearing surface. For example, see U.S. Pat. Nos. 3,689,346 (Rowland); 4,414,316 (Conley); 4,420,502 (Conley); and 4,374,077 (Kerfeld).

SUMMARY OF THE INVENTION

The invention provides a transparent, plano-convex base sheet which can be used to make retroreflective articles, including for example, transparent protective overlays for documents. The overlays can be imaged with information to enhance the authenticity of the document, e.g., a design or the bearer's photograph, and also provide high tamper-resistance. Some of the information can be in the form of so-called "flip-flop" images that are viewable only across a narrow range of angles and change color across that range of angles. Such images can be viewable in ambient light, thus affording a readily apparent verification of the authenticity of the document. A "flip-flop" image can afford a second level of authenticity, by becoming bright when viewed retroreflectively, thus making it especially difficult either to tamper with the document or to counterfeit the novel overlay. The invention also provides a method for making such base sheets.

In brief summary, the base sheets provided herein comprise a base sheet having first and second broad faces wherein the second face is substantially planar, the first face has an array of substantially hemi-spheroidal microlenses thereon. The shape of the microlenses and thickness of the base sheet are such that collimated light substantially orthogonally incident to the first face, i.e., the array, is focused approximately at the second face of the base sheet. Embodiments of the invention in the form of retroreflective articles further comprise a reflective layer on the second face of the base sheet.

Briefly summarizing, the method of the invention comprises:
a) preparing a curable composition;
b) depositing the composition onto a master surface having an array of substantially hemi-spheroidal concavities;
c) spreading a bead of the composition between a substrate and the master, the substrate being substantially planar, at least one of the substrate and the master being flexible;
d) curing the deposited composition to yield a composite comprising an array of substantially hemi-spheroidal microlenses bonded to the substrate; and
e) removing the composite from the master to yield the base sheet.

Typically, a specularly reflective layer will be applied to the second side of the substrate to yield a retroreflective article. If the reflective layer is transparent, the retroreflective article can be used as an overlay.

BRIEF DESCRIPTION OF THE DRAWING

The invention will be further explained with reference to the drawing. In the drawing:

FIGS. 1-3, which are idealized, are not to scale and are intended to be merely illustrative and non-limiting.

DETAILED DESCRIPTION OF ILLUSTRATIVE EMBODIMENTS

Figure 1:
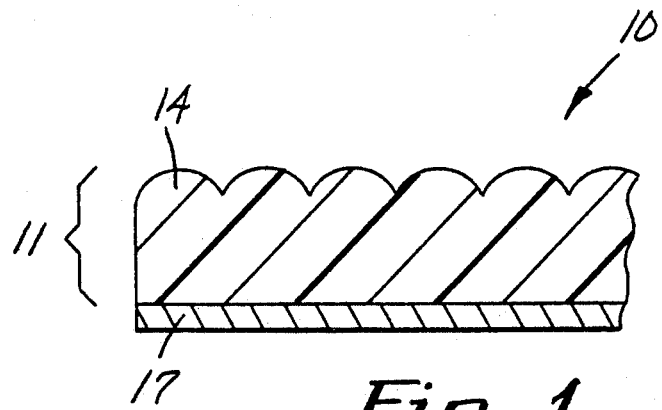
FIG. 1 is a schematic cross section of a portion of a retroreflective sheeting of the invention.

As shown in FIG. 1, in a typical retroreflective embodiment, article 10, e.g., reflective sheeting, comprises base sheet 11 having first and second broad faces, array 14 of substantially hemi-spheroidal microlenses on the first broad face, and substantially continuous specularly reflective layer 17 on the second face. Base sheet 11 is substantially transparent and has the proper refractive index and dimensions that collimated light orthogonally incident to the array is focused approximately at the second face of base sheet 11, i.e., at specularly reflective layer 17.

The base sheets provided herein are referred to as "plano-convex". This refers to the fact that the second or rear face is substantially flat and planar whereas the first or front face has an array of convex microlenses thereon. The microlenses are typically substantially hemi-spheroidal. A spheroid is the figure generated by revolving an ellipse about one of its axes. As used herein, "hemi-spheroidal" refers to the fact that each microlenses is only a portion of a spheroid. The axis of each microlens is substantially perpendicular to the plane of the base sheet at the base of the microlens. The perimeter of each microlens is widest at its base where it protrudes from the base sheet. The microlenses are generally very tiny, i.e., typically on the order of about 50 to about 150 micrometers wide at their bases. The surface of each microlens may conform to a portion of a true sphere, but are preferably proportionally wider and shorter than a portion of a true sphere to widen the width of the conical field in which incident light is focused to the second face of the base sheet. Typically, light which is incident to the array within a conical field oriented perpendicularly to the base sheet and having a full width of about 5 to about 10 degrees will be focused at the second face of the base sheet, and in retroreflective embodiments will be retroreflected. Incident light within this orientation is referred to herein as substantially orthogonal.

Figure 4:
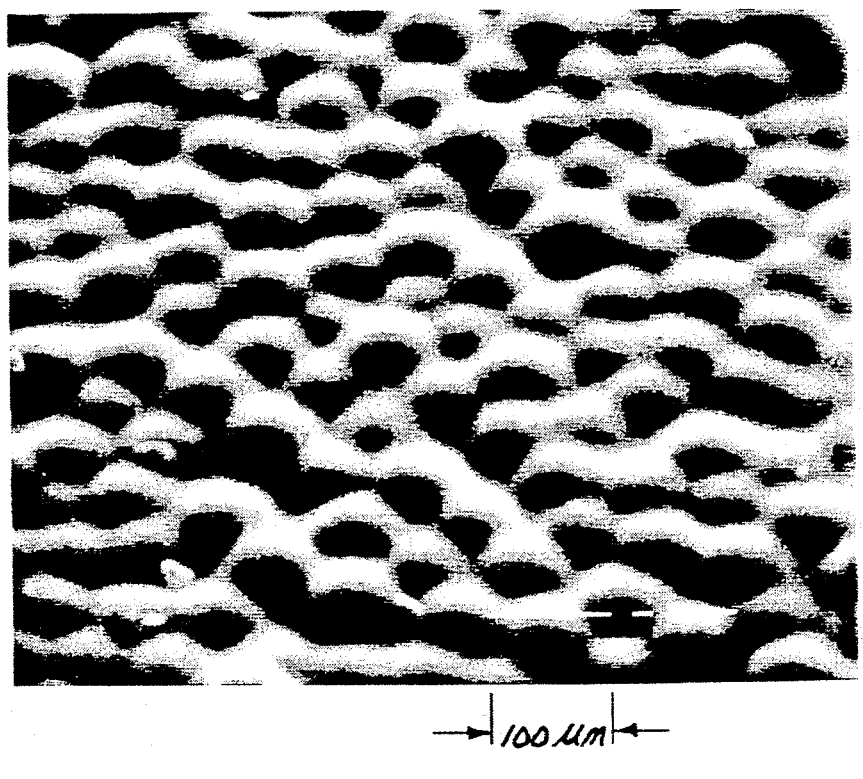
FIG. 4 is a photomicrograph the microlens-covered face of a base sheet of the invention.

Preferably, the microlenses are closely packed within the array to enhance the degree of focusing, and in retroreflective embodiments, increase the retroreflective brightness. In some embodiments, the microlenses may be so closely packed as to be substantially contiguous, i.e., the adjacent microlens are in contact rather than being spaced apart. In some instances, adjacent microlenses may be partially overlapping as shown in FIG. 4. An advantage of the invention is that the microlenses need not be arranged in ordered fashion, i.e., no particular arrangement such as cubic or hexagonal arrangement is necessary. As shown in FIG. 4, the microlenses may be arranged in essentially random arrangement.

When the article is to be used as a document overlay, the reflective layer is preferably transparent. Illustrative examples of reflective layers include zinc sulfide, cryolite, lithium fluoride, silicon oxides, and magnesium fluoride. U.S. Pat. No. 3,700,305 (Bingham et al.) and the aforementioned U.S. Pat. No. 3,801,183 disclose the use of dielectric mirrors as partially light transmissive reflectors and are incorporated herein by reference. When the reflective layer is transparent, it can be continuous without obscuring any information on the face of a document to which the novel protective overlay is applied. However, the reflective layer can be opaque when it is discontinuous and applied so as to not mask information on the face of the document to which it is applied.

A pattern of imaging material, i.e., clear ink or varnish, may be applied to the second face of the base sheet before a dielectric mirror is applied thereover to provide a legend or legends within an overlay of the invention.

Instead of or in addition to a message or pattern of clear ink, the second face of the transparent polymeric layer (beneath the reflective layer) can be imprinted with an opaque ink. For example, when the overlay is to be used to protect a document that has been preprinted with information standard to all like documents, e.g., with boxes labeled to receive a bearer's name, address, and the like, the opaque ink printing can fill those boxes with information specific to the bearer. If someone were able to peel such an overlay from a document, it would carry with it at least some of the opaque ink coating. Then to change the information, one would need to erase any part of that coating remaining on either the document or the overlay and add counterfeit information to fill the boxes. The task of doing so would be especially difficult when part of the ink coating is transparent and forms a so-called "flip-flop" image in a pattern that is easily disrupted upon tampering with the overlay.

To provide a "flip-flop" image, a message or pattern of clear ink is imprinted on the second face of the base sheet prior to application of a reflective layer thereover. The resultant change in nature of the surface of the base sheet tends to result in variations in thickness of the reflective layer when it is applied, thus producing an image that can repeat across the full face of the overlay and can be seen in ambient light with the naked eye across a narrow range of angles. The color of the image changes at differing viewing angles and is thus sometimes referred to as a "flip-flop" image. Any attempt to peel back the overlay to change underlying information is likely to disrupt the colored "flip-flop" image and thus alert anyone who looks at the document. Because the colored "flip-flop" image is bright when viewed retroreflectively, a retroreflective examination can provide secure proof that the document is authentic.

Figure 2:
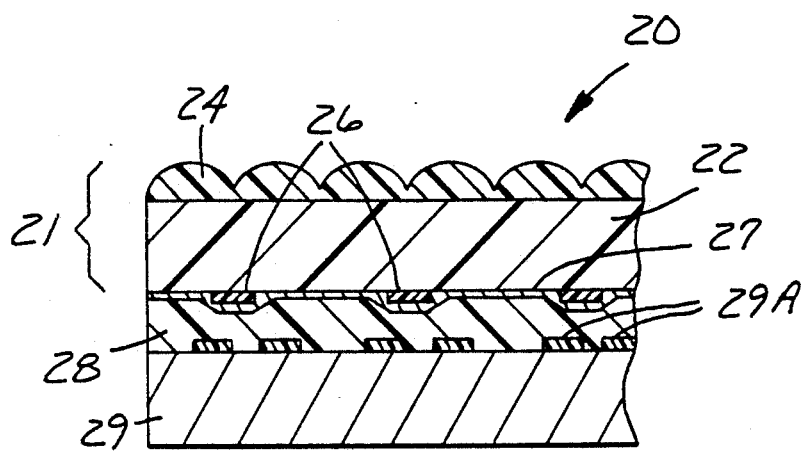
FIG. 2 is a schematic cross section of a portion of one embodiment of transparent protective overlay of the invention after it has laminated to the face of a document.

FIG. 2 illustrates another embodiment, wherein overlay 20 comprises base sheet 21 which consists of two strata, i.e., transparent spacing layer 22 and array 24 of microlenses. An advantage of such multi-strata embodiments is that the materials used for spacing layer 22 and array 24 may be independently selected to optimize the overall properties of the article. For instance, a high performace casting material which is used to make the array may be relatively expensive so that a cheaper material is used in the spacing layer to reduce the overall cost of the article. In another example, in the case of a document overlay, the array can be selected to be very hard and resistant to abrasion to impart greater durability whereas the spacing layer is selected to have a relatively low tensile strength to make its intact removal from a document more difficult.

Referring again to FIG. 2, on the rear face of spacing layer 22, i.e., the face opposite array 24, is discontinuous coating 26 of clear ink over which is continuous transparent reflective layer 27. Covering reflective layer 27 is adhesive layer 28 which may be used to secure overlay 20 to the face of document 29 over information 29A printed thereon.

Because retroreflective material 27 adhered better to the areas of clear ink 26 than it did to uninked areas of spacing layer 22 during application, e.g., by sputtering, it is thicker at the inked areas. The resultant variations in thickness of the transparent reflective layer 27 produce a colored "flip-flop" image that can be seen in ambient light through the polymeric layer, which image is bright when viewed retroreflectively.

Many different adhesives may be used on articles of the invention, including, for instance, hot melt adhesives, pressure-sensitive adhesives, and actinicly activated adhesives, e.g., heat-activated and ultraviolet-activated adhesives. In the case of document overlays, the adhesive should be substantially transparent.

Figure 3:
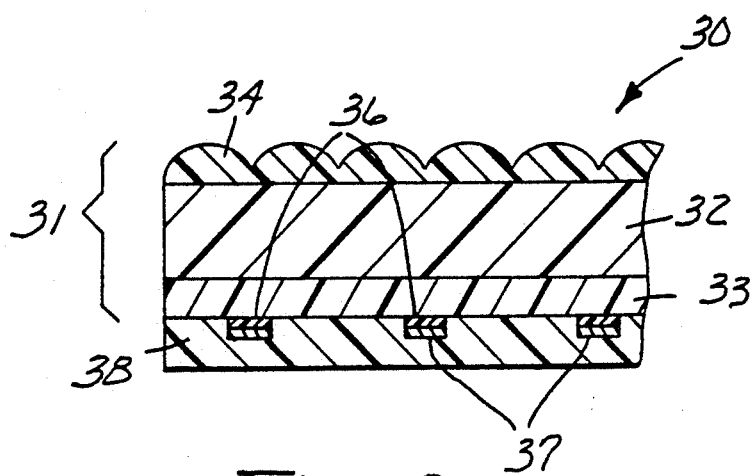
FIG. 3 is a schematic cross section of a portion of another embodiment of transparent protective overlay of the invention.

In some embodiments, document overlays may be made with a layer of adhesive disposed between the second face of the base sheet and the reflective layer as well as on the opposite side of the reflective layer as the base sheet. FIG. 3 shows such an embodiment wherein overlay 30 comprises transparent base sheet 31 consisting of spacing layer 32, array of microlenses 34, and transparent adhesive stratum 33. In such embodiments, light incident to array 34 is focused at the back side of adhesive stratum 33, i.e., the side opposite spacing layer 32. Applied to the back of adhesive 33, i.e., the face opposite base sheet 31, is pattern of ink 36 over which has been applied transparent reflective layer 37 that has adhered to ink 36 but not to adhesive 33. Covering reflective layer 37 is another layer of adhesive 38 by which overlay 30 can be adhered to the face of a document (not shown). When adhesive layers 33 and 38 are of identical composition, an attempt to remove overlay 30 from a document is likely to cause splitting of both layers of adhesive, thus making it especially difficult for anyone to tamper with the document and then replace the overlay without leaving a clear indication of the tampering.

An advantage of base sheets of the present invention is that they may be used to make retroreflective articles without utilizing a monolayer of relatively expensive microspheres. Retroreflective articles of the invention provide selective angularity as mentioned above and can be made relatively inexpensively. In the case of document overlays, any information and patterns printed between the back of the base sheet and the face of the document are protected by the base sheet. Resins used in forming the base sheet, and particularly the array of microlenses, can be selected to have excellent resistance both to abrasion and to weathering.

A base sheet composite that can be converted to retroreflective sheeting of the invention can be made by using, as an initial master, retroreflective sheeting that includes a monolayer of enclosed glass microspheres and a space coat bearing a metallic coating, e.g., the specularly reflective layer of FIG. 4 of U.S. Pat. No. 4,505,967 (Bailey). Such a metallic coating has a surface with hemi-spheroidal protrusions on which a forming master can be formed by the following method:

a) preparing transparent curable composition, such as an ultraviolet-curable oligomeric composition, e.g., as disclosed in U.S. Pat. No. 4,576,850;

b) depositing that oligomeric composition onto the continuously cured surface of the initial master;

c) spreading a bead of the composition between a substrate film and the initial master, the substrate being substantially planar, at least one of the substrate or master being flexible, as taught in U.S. Pat. No. 4,374,077;

d) curing the deposited composition, e.g., by ultraviolet radiation, to yield a composite of the substrate and cured oligomeric composition; and e) stripping the composite from the initial master to yield a forming master with surface having hemi-spheroidal cavities therein.

The aforementioned U.S. Pat. No. 4,374,077 discloses replication by polymerization of a liquid mass deposited between a shaped surface and a substrate to which the mass is to adhere and is incorporated herein by reference.

The composite with its surface of hemi-spheroidal cavities may be used as a forming master from which a base sheet of the invention is made. This can be done by performing a similar process utilizing the thusly made forming master and a substrate film or base film of proper thickness to act as a spacing layer. Illustrative examples of useful base films include flexible films of polyester, polyvinyl chloride, and polymethyl methacrylate. Alternatively, the forming master may be specially tooled to form a desired array of microlenses. It will typically be somewhat expensive to masters in that fashion, an advantage of the technique described above being that a suitable forming master can be obtained rather economically.

The curable composition is selected in part for its processing properties, i.e., viscosity, curing conditions, etc., and its post-cure properties, i.e., abrasion resistance, clarity, etc. In illustrative class of curable compositions are the ultraviolet-curable compositions disclosed in the aforementioned U.S. Pat. No. 4,576,850 which is incorporated herein by reference. That patent discloses one-part, solvent-free, radiation addition-polymerizable oligomeric compositions containing hard and soft segments. The compositions typically contain between about 0.1 and about 0.5 percent by weight of photoinitiator. The hard segments preferably are polyurethane, and the soft segments preferably are polyester.

The curable composition is preferably applied to the forming master in limited quantity, e.g., such that the composition completely fills the hemi-spheroidal cavities but does not extend above the surface of the forming master by a distance greater than about 20 percent of the average depth of the cavities. In this fashion, the substrate film which becomes at least part of the spacing layer may be used to substantially define the desired overall tensile and film-like integrity of the article. Also, the curable composition is typically more expensive than the substrate film material, and it is typically easier to control shrinking and warping during curing if the curable mass is of reduced thickness. Preferably, the microlens array is between about 0.01 and about 0.05 millimeter in thickness when a retroreflective sheeting containing a monolayer of microspheres having an average diameter of about 65 micrometers is used as an initial master as described above. In such instances, the spacing layer is typically between about 0.2 and about 0.3 millimeters thick.

The viscosity of the oligomeric composition as deposited in step b) preferably is within the range of about 1,000 to about 5,000 centipoise ("cps"). Above that range, air bubbles might tend to be entrapped, and the resin might not completely fill the cavities of the master molding surface. Below that range, the resin would tend to shrink upon curing to such an extent that the cured resin may not faithfully replicate the master molding surface. Preferably, the viscosity of the resin is between about 2,000 and about 3,000 cps. Within that preferred range, the oligomeric composition should completely fill the master cavities without any need to apply pressure. However, when the cavities are unusually deep and/or narrow, it may be desirable to reduce the viscosity below 2,000 cps, because some shrinkage is to be preferred over any failure to fill the features completely.

In order to achieve the desired viscosity in compositions such as disclosed in U.S. Pat. No. 4,576,850, it may be necessary to include in the oligomeric composition an ethylenically unsaturated monomer such as an alkyl acrylate, preferably an alkyl acrylate of which the alkyl group contains a straight chain of from 4 to 12 carbon atoms. The relative amounts of oligomer and monomer should be controlled so that the overall equivalent weight of the composition is not so low that there is unacceptably high shrinkage upon curing.

Polyvinyl chloride is a preferred substrate for use in step c) as it is typically economical, durable, transparent, and dimensionally stable. Other illustrative examples of useful substrates include polycarbonate, biaxially oriented polypropylene and biaxially oriented polyethylene terephthalate films, the surfaces of which have been treated to promote adhesion to the oligomeric composition, e.g., by corona treatment. Any of those substrates, typically used in thicknesses between about 0.05 and about 0.4 millimeter, can be flexed to propagate a bead of resin as taught in U.S. Pat. No. 4,374,077. Additional illustrative examples of useful substrates include cellulose acetate butyrate, cellulose acetate propionate, polyether sulfone, polymethyl methacrylate, and polyurethane films, and glass.

The curable composition and substrate are preferably selected that upon curing a strong bond is formed therebetween.

The optimum thickness of the substrate layer or spacing layer is dependent in part upon the average size and shape of the microlenses. In typical retroreflective sheeting such as used as an initial master as described above, 80 percent of the microspheres have a diameter within 15 percent of the average. When the average diameter of the microspheres is about 65 micrometers, the microlenses of the resultant base sheet of the invention have an approximate average focal length of between about 0.2 and about 0.3 millimeter, thus allowing a spacing layer to be between about 0.2 and about 0.3 millimeter in thickness, or somewhat thinner when a transparent adhesive layer is provided between the base sheet and reflective layer. Because a thinner substrate would be more economical and equally useful, it may be preferred to start with retroreflective sheeting having glass microspheres of smaller average diameter.

Articles of the invention may be made in substantially rigid or flexible form. For instance, with selection of suitable materials, articles of the invention may be so flexible as to be capable of being wound into roll form about a mandrel 1 centimeter in diameter.

EXAMPLES

The invention will be further explained by the following illustrative examples which are intended to be nonlimiting. Unless otherwise indicated, all amounts are expressed in parts by weight.

Reflective Brightness

Retroreflective Brightness was measured at 0.2° divergence angle and −4° entrance angle in candellas per lumen using a retroluminometer as described in United States defensive publication T987,003.

EXAMPLE 1

A one-part, solvent-free, radiation addition-polymerizable, crosslinkable, organic oligomeric composition having hard segments and soft segments and a viscosity of 1600 cps was prepared by blending together the following components:

|  | Parts |
| --- | --- |
| acrylate-capped polycaprolactone urethane oligomer | 54.3 |
| N-vinyl pyrrolidone | 16.3 |
| [(ethoxy)-2-ethoxyethyl acrylate | 11.3 |
| 1,6-hexanediol diacrylate | 5.7 |
| N-(isobutoxy methyl)acrylamide | 11.1 |
| tertiary amine mixture (TINUVIN 292 from Ciba-Geigy) | 1.0 |
| 1-hydroxy cyclohexyl acetophenone | 0.25 |

Used as an initial master surface was the metallic reflective layer of an enclosed-lens retroreflective sheeting comprising a monolayer of glass microspheres having an average diameter of about 65 micrometers. Onto the metallic layer was deposited the liquid oligomeric composition in an amount barely sufficient to fill the cavities of the metallic layer. This was overlaid with clear polycarbonate film 0.125 millimeter in thickness through which the oligomeric composition was irradiated using 2 passes of a medium-pressure mercury lamp of 350 to 380 nanometers, 125 watts per linear centimeter, thus providing a total exposure of 110 millijoule/centimeter$^2$. The contoured surface of the resulting first composite consisted of substantially contiguous hemi-spheroidal concavities.

The same procedure was repeated using the resultant composite as a forming master, thus producing a second composite having a total thickness of about 0.2 millimeter and consisting of a polycarbonate substrate and an array of substantially hemi-spheroidal microlenses.

Over the flat surface of the second composite, aluminum was applied by vacuum deposition to a thickness of about 70 nanometers. The resulting retroreflective sheeting had a Reflective Brightness of 390 candellas per lumen.

EXAMPLE 2

A composite was made like the second composite of Example 1 except that the thickness of its polycarbonate substrate was 0.25 millimeter. The photomicrograph of FIG. 4 shows the resultant microlens array.

Onto the flat surface of the polycarbonate substrate was screen-printed a pattern of colorless ink (RAGE-800 Ink from Advance Process Supply of Chicago) that dried to a thickness of less than 0.01 millimeter. Over this, zinc sulfide was applied by vacuum deposition to a thickness of about a quarter wavelength at 520 nanometer to provide a transparent reflective layer. The ZnS tended to stick to only the clear ink and the ares immediately around the ink deposits, leaving the exposed areas of polycarbonate uncovered. A 0.05 millimeter thick layer of ELVAX 550, an ethylene/vinyl acetate copolymer hot melt adhesive from Du Pont was then laminated thereover. The resulting transparent protective overlay of the drawing was laminated by its adhesive layer at 82° C. to the face of a driver license bearing printed information.

When viewed through the overlay, that printed information was clearly readable in spite of a faintly colored "flip-flop" image where the clear ink had been applied, which image was in a pattern extending over the whole face of the driver license and was clearly visible in ambient light. When viewed retroreflectively, the pattern was bright.

The microlenses were rubbed with fine sandpaper to simulate the wear that could be expected over a period of several years in normal use, after which the printed information remained readable and the colored "flip-flop" pattern remained clearly visible in ambient light.

EXAMPLE 3

A driver license was made in the same manner as in Example 1 except as follows:
a) the substrate was poly(vinyl chloride);
b) two layers of the adhesive were applied as illustrated in FIG. 3;
c) a pattern of the colorless ink was screen-printed onto the exposed face of the adhesive layer that was applied to the second face of the base sheet;
d) ZnS was applied over this pattern and adhered only to the ink and not to the adhesive.

When this driver license was viewed through the overlay, a "flip-flop" image like that of Example 2 was visible in ambient light and was bright when viewed retroreflectively.

EXAMPLE 4

A composite (about 15×28 centimeters) was made like the second composite of Example 1 except that the substrate was polyvinyl chloride 0.25 millimeter in thickness, and it was converted to retroreflective sheeting by applying ZnS by vacuum deposition to a thickness of about a quarter wavelength at 520 nanometers. Reflective Brightness measurements were made at each of the four corners and at the midpoints along the long sides. Results, in candellas per lumen, were:

| 68 | 78 | 71  |
|----|----|-----|
| 56 | 71 | 69. |

In view of the fact that the thermoplastic polyvinyl chloride film inevitably has variations in thickness which result in a somewhat non-uniformly thick spacing layer and that the microlenses varied in size, these values are remarkably uniform.

EXAMPLE 5

A composite was prepared as in Example 2 except that the colorless ink was replaced by a colored transparent ink formulated as follows: 80 parts of colorless ink (Roto/Flexo Extender FA-1626 from Sinclair and Valentine, St. Paul, Minn.) and 20 parts of AFFLAIR 235 Rutile Green Pearl Interference pigment from EM Industries, Inc., Hawthorne, N.Y. The composite was then, as in Example 2, converted into a retroreflective sheeting that was adhered to the face of a driver license. The resulting "flip-flop" image was more strongly colored than was that obtained in Example 2, but printed information on the face of the driver license was readable through the image.

Various modifications and alterations of this invention will become apparent to those skilled in the art without departing from the scope and spirit of this invention.

What is claimed is:

1. A transparent base sheet having first and second broad faces, said second face being substantially planar and said first face having an array of substantially hemispheroidal microlenses thereon, said microlenses being wider and shorter than portions of true spheres, the shape of said microlenses and thickness of said base sheet being such that collimated light substantially orthogonally incident to said array is focused approximately at said second face.

2. The base sheet of claim 1 wherein said microlenses are substantially contiguous.

3. The base sheet of claim 1 wherein said base sheet comprises a transparent spacing layer having substantially planar first and second broad faces and a microlens layer comprising said array of microlenses, said spacing layer and said microlens layer being bonded together.

4. The base sheet of claim 1 wherein said microlenses are arranged in a substantially random arrangement.

5. A retroreflective article comprising the base sheet of claim 1, wherein said second face of said base sheet has a specularly reflective layer thereon such that collimated light substantially orthogonally incident to said array is focused approximately at said second face so as to be retroreflected by said article.

6. The article of claim 5 wherein said reflective layer is discontinuous.

7. The article of claim 5 wherein said base sheet comprises a transparent spacing layer having substantially planar first and second broad faces and a microlens layer comprising said array of microlenses, said spacing layer and said microlens layer being bonded together.

8. The article of claim 7 wherein the total thickness of said article is between about 0.05 and about 0.4 millimeters.

9. The article of claim 7 wherein the total thickness of said spacing layer is between about 0.2 and about 0.3 millimeters.

10. The article of claim 5 further comprising a layer of adhesive on the side of said reflective layer opposite said spacing layer.

11. The article of claim 10 wherein reflective layer and said layer of adhesive are transparent.

12. The article of claim 11 further comprising an imaging material disposed between said second face of said base sheet and said reflective layer.

13. The article of claim 12 wherein at least part of said imaging material is clear and forms an image that, when the article is adhered to a document with information thereon by said adhesive layer, can be seen in ambient light by the unaided eye without interfering with the readability of the information on the document.

14. The article of claim 5 wherein said reflective layer is opaque and discontinuous.

15. The article of claim 5 wherein said base sheet further comprises a layer of transparent adhesive in contact with said reflective layer.

16. The article of claim 5 wherein said article is sufficiently flexible to be wound into roll form about a mandrel 1 centimeter in diameter.

17. The article of claim 5 wherein said microlenses are arranged in a substantially random arrangement.

18. A document comprising:
a) a substantially transparent protective overlay comprising: i) a transparent base sheet having first and second broad faces, said second face being substantially planar and said first face having an array of substantially hemi-spheroidal microlenses thereon, said microlenses being wider and shorter than portions of true spheres; and ii) a specularly reflective layer comprising an inner face and an outer face, said outer face being bonded to said second face of said base sheet; and b) a document substrate bonded to said inner face of said reflective layer through a layer of adhesive, wherein the shape of said microlenses and thickness of said base sheet are such that collimated light substantially orthogonally incident to said array is focused approximately at said second face of said base sheet so as to be retroreflected by said overlay.

19. The document of claim 18 wherein said reflective layer is discontinuous.

20. The document of claim 19 wherein said reflective layer is opaque.

21. The document of claim 18 wherein said reflective layer and said layer of adhesive are transparent so that said document substrate can be seen in ambient light by the unaided eye.

22. The document of claim 18 wherein said microlenses are arranged in a substantially random arrangement.

* * * * *

UNITED STATES PATENT AND TRADEMARK OFFICE
CERTIFICATE OF CORRECTION

PATENT NO. : 5,254,390

DATED : October 19, 1993

INVENTOR(S) : Shih-Lai Lu

It is certified that error appears in the above-identified patent and that said Letters Patent is hereby corrected as shown below:

On the title page, item [54] and col. 1, lines 2-3, delete "AND METHOD FOR MAKING SAME" from the title.

Signed and Sealed this

Twenty-fourth Day of May, 1994

Attest:

BRUCE LEHMAN

*Attesting Officer*  *Commissioner of Patents and Trademarks*

REEXAMINATION CERTIFICATE (3765th)

United States Patent [19]

Lu

[11] B1 5,254,390
[45] Certificate Issued May 18, 1999

[54] PLANO-CONVEX BASE SHEET FOR RETROREFLECTIVE ARTICLES

[75] Inventor: Shih-Lai Lu, Woodbury, Minn.

[73] Assignee: Minnesota Mining and Manufacturing Company, Saint Paul, Minn.

Reexamination Request:
No. 90/004,863, Dec. 9, 1997

Reexamination Certificate for:
Patent No.: 5,254,390
Issued: Oct. 19, 1993
Appl. No.: 07/613,136
Filed: Nov. 15, 1990

Certificate of Correction issued May 24, 1994.

[51] Int. Cl.$^6$ .................................................. B32B 3/00
[52] U.S. Cl. .......................... 428/156; 428/143; 428/148; 428/161; 428/163; 428/164; 428/167; 428/168; 428/172; 428/195; 428/201; 428/206; 428/209; 428/215; 428/344; 428/354; 428/906; 359/291; 359/321; 359/536; 359/542; 359/641
[58] Field of Search ........................... 428/141, 143, 428/148, 156, 161, 163, 164, 167, 168, 172, 194, 201, 206, 207, 215, 212, 402, 409, 906, 343, 344, 354; 356/71, 445; 359/227, 291, 321, 536, 542, 641

[56] References Cited

U.S. PATENT DOCUMENTS

| | | | |
|---|---|---|---|
| 1,824,353 | 9/1931 | Jensen | 359/455 |
| 4,025,673 | 5/1977 | Reinnagel | 428/29 |
| 4,127,693 | 11/1978 | Lemelson | 428/163 |
| 5,177,637 | 1/1993 | Tsukada | 359/599 |

*Primary Examiner*—Donald J. Loney

[57] ABSTRACT

An article comprising a transparent plano-convex base sheet having first and second broad faces, the second face being substantially planar and the first face having an array of substantially hemi-spheroidal microlenses thereon, the shape of the microlenses and thickness of the base sheet being such that collimated light substantially orthogonally incident to the array is focused approximately at the second face. The article optionally further comprising a specularly reflective layer on the second face which renders the base sheet retroreflective. An optional layer of adhesive over the reflective layer permits the article to be adhered to a document as a tamper-indicating, authenticating, and protective overlay. Special images can be formed within the article to enhance the security provided thereby. Also, a method for forming such articles.

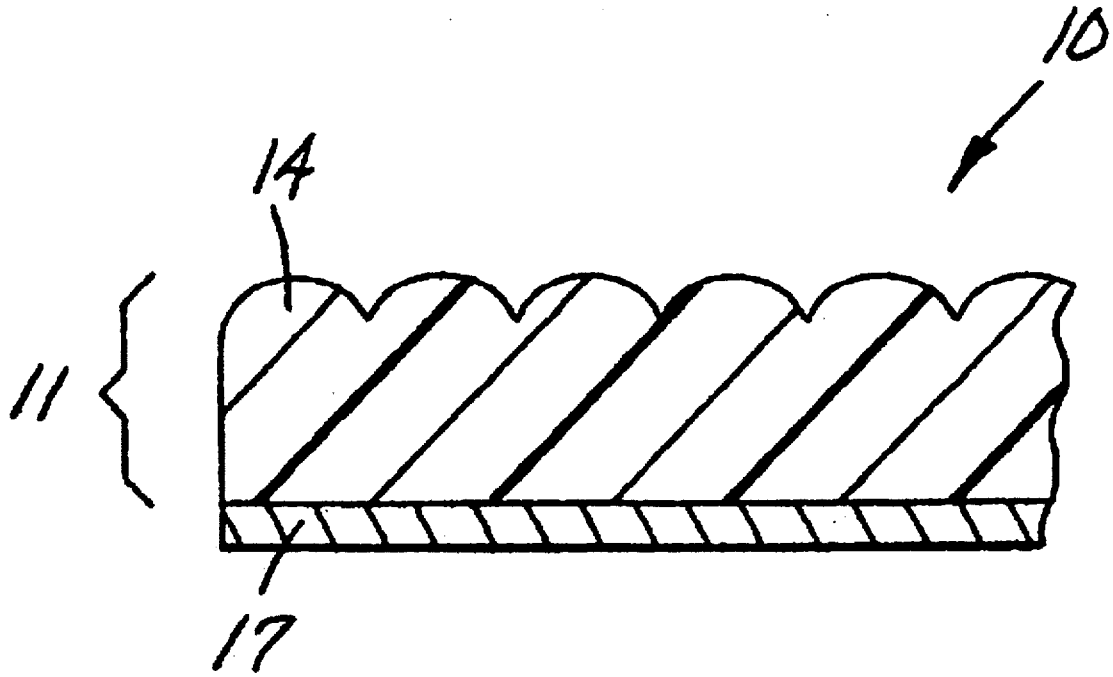

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 17 and 22 are cancelled.

Claims 1 and 18 are determined to be patentable as amended.

Claims 2–16 and 19–21, dependent on an amended claim, are determined to be patentable.

1. A transparent base sheet having first and second broad faces, said second face being substantially planar and said first face having a[n] *substantially random* array of substantially hemi-spheroidal microlenses thereon, said microlenses being wider and shorter than portions of true spheres, the shape of said microlenses and thickness of said base sheet *being* such that collimated light substantially orthogonally incident to said array is focused approximately at said second face.

18. A document comprising:

a) a substantially transparent protective overlay comprising: i) a transparent base sheet having first and second broad faces, said second face being substantially planar and said first face having [an] *a substantially random* array of substantially hemi-spheroidal microlenses thereon, said microlenses being wider and shorter than portions of true spheres; and ii) a specularly reflective layer comprising an inner face and an outer face, said outer face being bonded to said second face of said base sheet; and b) a document substrate bonded to said inner face of said reflective layer through a layer of adhesive, wherein the shape of said microlenses and thickness of said base sheet are such that collimated light substantially orthogonally incident to said array is focused approximately at said second face of said base sheet so as to be retroreflected by said overlay.

* * * * *